(12) United States Patent
Dressel et al.

(10) Patent No.: US 8,561,312 B2
(45) Date of Patent: Oct. 22, 2013

(54) RECEPTACLE HAVING INTEGRALLY FORMED PROTRUSIONS FOR MARKING

(75) Inventors: Bruce B. Dressel, Aylett, VA (US); Marshall V. C. Dressel, Everson, WA (US)

(73) Assignee: Dressel Designs, LLC, Everson, WA (US)

( * ) Notice: Subject to any disclaimer, the term of this patent is extended or adjusted under 35 U.S.C. 154(b) by 201 days.

(21) Appl. No.: 13/078,646

(22) Filed: Apr. 1, 2011

(65) Prior Publication Data

US 2011/0239477 A1    Oct. 6, 2011

Related U.S. Application Data

(60) Provisional application No. 61/341,512, filed on Apr. 1, 2010, provisional application No. 61/342,912, filed on Apr. 22, 2010.

(51) Int. Cl.
*G01B 5/14* (2006.01)

(52) U.S. Cl.
USPC ........................................ 33/528; 33/DIG. 10

(58) Field of Classification Search
USPC ............. 33/528, DIG. 10, 666, 669, 670, 671
See application file for complete search history.

(56) References Cited

U.S. PATENT DOCUMENTS

| | | | |
|---|---|---|---|
| D31,796 S | 11/1899 | Morgan | |
| 1,222,961 A | 4/1917 | Maker | |
| 1,260,226 A | 3/1918 | Maker | |
| 1,904,242 A * | 4/1933 | Kieckheafer | 33/670 |
| 2,775,812 A | 1/1957 | Mohr | |
| 2,788,151 A * | 4/1957 | Shore | 220/3.4 |
| 2,809,440 A | 10/1957 | Schlage | |
| 2,887,776 A | 5/1959 | Eisner | |
| 2,898,688 A | 8/1959 | Cottar | |
| 3,888,013 A * | 6/1975 | Benoit | 33/528 |
| 3,924,331 A * | 12/1975 | Goosen | 30/366 |
| 3,940,857 A | 3/1976 | Giordano | |
| 3,943,631 A * | 3/1976 | Smugor | 33/528 |
| D242,903 S | 1/1977 | Benoit | |
| D242,904 S | 1/1977 | Benoit | |
| 4,059,905 A | 11/1977 | Wieting | |
| 4,096,964 A * | 6/1978 | Glick | 220/3.4 |

(Continued)

OTHER PUBLICATIONS

Rocker's Stub-Out Clip. Downloaded on Sep. 8, 2012, at http://www.dresseldesigns.com/Products.html, 1 page.

(Continued)

*Primary Examiner* — Christopher Fulton
(74) *Attorney, Agent, or Firm* — Seed IP Law Group PLLC (57) ABSTRACT

The present disclosure is directed to a construction device having a receptacle configured to provide an indication of a geometric shape of the receptacle on a panel of sheetrock. The receptacle includes walls having a thickness and a length, a cavity delimited by the walls, the cavity configured to provide an interface through the panel of sheetrock, a first end configured to abut the panel of sheetrock, the first end having a surface that corresponds to the thickness of the walls, a second end spaced from the first end by the length of the walls, and a plurality of integrally formed protrusions extending from the surface of the first end, the protrusions configured to at least indent the panel of sheetrock to form a pattern of indentations that indicate the geometric shape of the receptacle.

13 Claims, 8 Drawing Sheets

(56) References Cited

U.S. PATENT DOCUMENTS

| | | | | |
|---|---|---|---|---|
| 4,202,388 | A * | 5/1980 | Wieting | 144/353 |
| 4,209,103 | A * | 6/1980 | Glovier | 220/3.4 |
| 4,259,785 | A | 4/1981 | Wortham | |
| 4,589,211 | A | 5/1986 | Policka | |
| 4,605,139 | A * | 8/1986 | Dacar | 220/3.4 |
| 4,802,284 | A | 2/1989 | Jackson | |
| 4,837,942 | A | 6/1989 | Watts | |
| 4,907,711 | A * | 3/1990 | Stuchlik, III | 220/3.8 |
| 4,953,733 | A * | 9/1990 | Loscuito | 220/3.4 |
| D315,316 | S | 3/1991 | Reynolds et al. | |
| 5,040,304 | A | 8/1991 | Jackson | |
| 5,103,695 | A | 4/1992 | Dolle et al. | |
| 5,136,788 | A | 8/1992 | Jackson | |
| 5,152,073 | A * | 10/1992 | Sloan | 33/670 |
| 5,157,844 | A | 10/1992 | Mallison et al. | |
| 5,172,483 | A | 12/1992 | Yocono, Sr. et al. | |
| D374,320 | S | 10/1996 | Grande | |
| 6,055,736 | A | 5/2000 | Gaston | |
| 6,101,731 | A | 8/2000 | Mesa | |
| 6,124,935 | A * | 9/2000 | Matthews | 356/399 |
| 6,289,594 | B1 | 9/2001 | Wrobbel | |
| D456,287 | S | 4/2002 | Ferruggia | |
| 6,403,883 | B1 * | 6/2002 | Morgan et al. | 174/58 |
| 6,463,668 | B1 | 10/2002 | Williams | |
| 6,467,174 | B1 | 10/2002 | Kotori | |
| 6,511,269 | B1 * | 1/2003 | Smasne | 409/132 |
| 6,643,019 | B1 * | 11/2003 | Jeanneret | 356/399 |
| D484,013 | S | 12/2003 | Alverson, Jr. | |
| 6,938,354 | B2 | 9/2005 | Worthington | |
| 6,944,962 | B2 | 9/2005 | Tessel et al. | |
| 6,952,887 | B2 | 10/2005 | Muchnik | |
| 7,210,241 | B1 * | 5/2007 | Bree | 33/528 |
| 7,572,978 | B1 | 8/2009 | Keith, Jr. | |
| 7,891,108 | B1 | 2/2011 | Cordobes | |
| D636,645 | S | 4/2011 | Bell | |
| 2006/0010704 | A1 * | 1/2006 | Galbreth | 33/670 |
| 2006/0075650 | A1 * | 4/2006 | Tatum | 33/666 |
| 2007/0283588 | A1 * | 12/2007 | Gardner et al. | 33/666 |
| 2009/0057303 | A1 | 3/2009 | Oddsen et al. | 220/3.5 |

OTHER PUBLICATIONS

HandyMark Drywall Tool, URL=http://www.handymark.net, download date Apr. 1, 2011, 1 page.

* cited by examiner

RECEPTACLE HAVING INTEGRALLY FORMED PROTRUSIONS FOR MARKING

CROSS-REFERENCES TO RELATED APPLICATIONS

This application claims the benefit under 35 U.S.C. §119(e) of U.S. Provisional Patent Application No. 61/341,512 filed Apr. 1, 2010, and U.S. Provisional Patent Application No. 61/342,912 filed Apr. 22, 2010, where these provisional applications are incorporated herein by reference in their entireties.

BACKGROUND

1. Technical Field

Devices for marking and, more particularly, to surface indentation implements or marking implements formed integral with and removable from an object to be mounted in connection with a surface.

2. Description of the Related Art

When constructing or remodeling commercial and residential buildings, various types of panels are used to form walls, ceilings, and other surfaces in the buildings. These panels are attached to a frame that in typical residential and some commercial construction is composed of frame members, such as beams or studs. Openings are formed in the panels that correspond to housings mounted on the frame members that provide transitions through the panel, such as electrical outlets, junction boxes, light fixtures, conduits, cabinets, windows, and doors. The openings are typically formed prior to permanently attaching the panels to the frame. Thus, the panel is placed on the frame members with the panel opening aligned over the housings.

Once the panels are permanently attached to the frame members, seams between adjacent panels are sealed. Because most of these housings are concealed behind the panels after installation, problems arise if these openings are not precisely aligned with the housings or if openings are not formed where the housing is positioned behind the panel.

For example, if the opening for an electrical outlet is off-set from the actual position of the electrical outlet, the opening has to be adjusted or patched so that the final opening is aligned with the outlet and a cover plate actually overlaps the opening. If the misalignment is extreme, the panel may have to be removed and discarded, which is costly in both material and labor costs.

Alternatively, if an opening has not been formed where an electrical outlet should be installed, a series of outlets may be rendered useless until the hidden electrical outlet is found. Locating the hidden outlet may require tearing down the panel and reinstalling a new panel that includes the previously omitted opening.

There are several methods of forming these openings in the panels. For example, some openings are formed by measuring horizontal and vertical distances by hand. A measurement is taken from an estimated position of where an edge of the panel will be installed to an edge of the housing that is attached to the frame. This measurement is then transferred to the panel by locating the edge of the panel and marking where the edge of the housing should ultimately be. A template is used to draw an outline of the housing and this outline is used as a guide to cut the opening for the housing in the panel. This method is imprecise and can result in misalignment of the opening, incorrect opening sizes if the wrong template is used, or an opening may not be formed where the housing is located.

Other methods include applying chalk, ink, or lipstick to edges of the housing and pressing the panel against the edge of the housing to mark the panel. The panel is removed and the housing is cut based on the mark. The disadvantage with this approach is that the marks can smudge, resulting in imprecise openings. This is frequently the case when there are several housings to be marked simultaneously.

U.S. Pat. No. 6,202,731 to Mesa describes spiked clips configured to couple to corners or edges of existing electrical boxes. Each clip includes a sharp outwardly projecting prong that penetrates an installed drywall panel. The drywall panel has a front and a rear surface. The rear surface faces the clips and the prong. Once installed, the prong pierces the drywall panel completely so that a tip of the prong protrudes from the front surface of the drywall.

The protruding prongs provide a marking guide to form the opening while the drywall is coupled to the frame. If the prongs are in place during the cutting of the opening, the prongs prevent a user from making precise cuts where the prongs are protruding from the drywall. Cutting the opening while the drywall is attached to the frame causes drywall residue, like chalk, to be in the electrical box, in the air, and in the room where the drywall is installed. In addition, it can be difficult for the user to easily cut the drywall while it is attached, crouching down for the electrical boxes that are positioned near the floor and getting a ladder for the electrical boxes that are near or in the ceilings. To remove the prongs, they are pulled from the front surface through the drywall. Regardless of whether the prongs are removed before or after the cutting, this pulling damages the drywall and causes the opening to be misshapen.

Another problem arises if the user wishes to remove the drywall from the frame before cutting the opening. Once the prongs have punctured the front and rear surface of the drywall, removing the drywall will either remove the clip from the electrical box or remove the prong from the clip. Each clip or prong will have to be removed individually, which is time consuming if there are several electrical boxes or other structures onto which the clips have been placed. Drawing the marking guide once the prongs have been removed can be challenging because a pen will be clogged by the chalk. Any writing utensil will not easily pass over the punctures left by the prong and will slip into the punctures.

The prongs weaken the drywall when they puncture through the front and rear surface and compromise the integrity of the drywall. In addition, these sharp prongs can be dangerous for the user, easily puncturing skin. Also, in order to use these clips, the user must figure out how many corners of electrical boxes there are and make sure to have enough of these clips with prongs before the drywall is installed. If the user does not have enough clips, it is difficult to simultaneously mark the electrical boxes without clips while puncturing the drywall where there are clips in place.

BRIEF SUMMARY

The present disclosure is directed to devices for accurately and efficiently marking a surface of one or more panels used in construction of buildings. Surface indentation implements are formed integral with and removable from an object to be mounted in conjunction with an opening formed in the surface of the panels.

One embodiment of the present disclosure includes a receptacle having integrally formed protrusions extending from the receptacle and configured to indent or mark the surface of a panel of SHEETROCK or drywall when the panel is pressed up against the frame. The protrusions form an indication of a geometric shape of the receptacle in the surface of the panel.

Another embodiment of the present disclosure is a construction device that includes a receptacle configured to provide an indication of a geometric shape of the receptacle on a panel. The receptacle includes walls having a thickness and a length, a cavity delimited by the walls, the cavity configured to provide an interface through the panel, a first end configured to abut the panel, the first end having a surface that corresponds to the thickness of the walls, and a second end spaced from the first end by the length of the walls. The receptacle also includes a plurality of integrally formed protrusions extending from the surface of the first end, the protrusions configured to at least indent the panel to form a pattern of indentations that indicate the geometric shape of the receptacle.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with construction techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the terms "correspond," "corresponds," and "corresponding" are intended to describe a ratio of or a similarity between referenced objects. The use of "correspond" or one of its forms should not be construed to mean the exact shape or size.

In the drawings, identical reference numbers identify similar elements or acts. The size and relative positions of elements in the drawings are not necessarily drawn to scale.

The present disclosure is directed to devices for marking a surface of panels used in remodeling or constructing buildings. Surface indentation implements or marking implements are formed integral with and removable from an object to be mounted in conjunction with the surface of the panels. As stated above, the objects include electrical outlets, junction boxes, light fixtures, heating and ventilation fixtures, conduits, cabinets, windows, and doors, to name a few.

Figure 1:
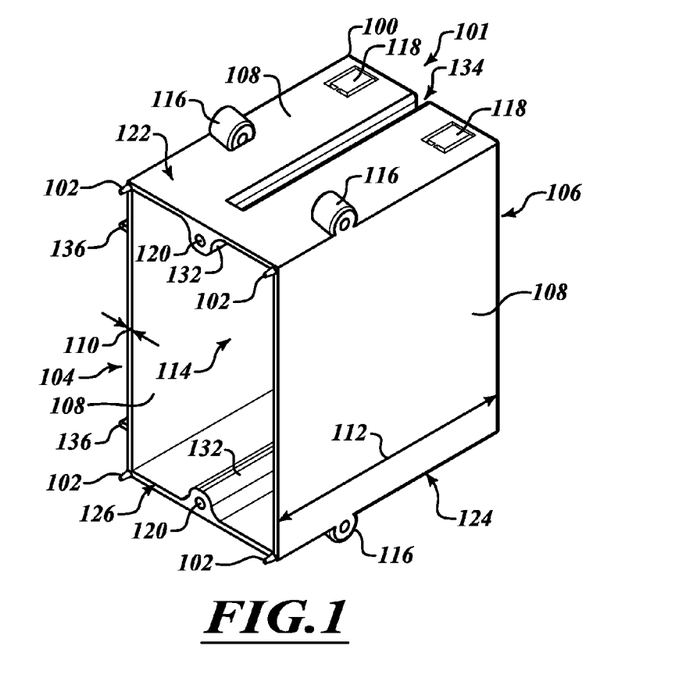
FIG. 1 is an isometric view of a rectangular receptacle having conical protrusions.
Figure 2:
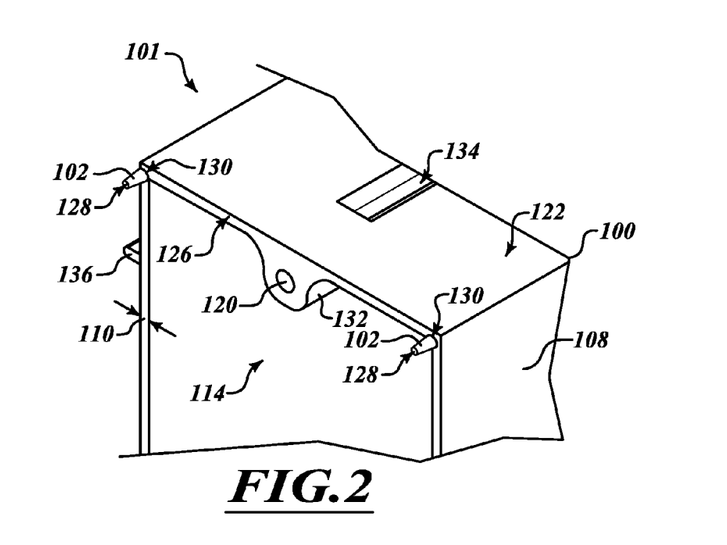
FIG. 2 is an enlarged view of one of the conical protrusions of FIG. 1.

FIGS. 1 and 2 are an isometric view and an enlarged view, respectively, of a construction device 101 for marking the interior surface of the panel in accordance with an embodiment of the present disclosure. The construction device is a rectangular receptacle 100 that includes integrally formed protrusions 102 extending from the receptacle 100 and configured to indent or mark the surface of the panel to form an indication of the rectangular boundaries of the receptacle 100.

The receptacle 100 is configured to be mounted on the underlying framework and behind or flush with the panel that forms a wall, ceiling, or floor of a building. The panel may be formed of SHEETROCK, drywall, wallboard, gypsum board, particle board, plywood, sheet metal, or any other type of material suitable for use in forming walls, ceilings, and other surfaces of the building. These materials each can have different thicknesses and resistance to marking. For example, some panels are softer, such as SHEETROCK that has an inner and an outer sheath with a porous chalky material sandwiched between the sheaths. Accordingly, the protrusions 102 may be formed in a variety of shapes and sizes to ensure reasonable pressure applied to the panel will form the indentations.

As shown in FIGS. 1 and 2, the protrusions 102 are configured to form the indication of the geometric shape of the receptacle 100, which is used to form a self-aligned opening in the panel that corresponds to a location of the receptacle 100 attached to the frame of the building. These geometric shapes can include rectangles, squares, circles, ovals, triangles, and other polygons. A process of forming this opening is described in more detail below with respect to FIGS. 6-13.

The openings are structured to provide access to the receptacle 100 through the panel or to allow the receptacle to project or extend through the panel. Ultimately, a cover or plate can be positioned on the panel in line with the receptacle 100 to provide a finished appearance, such as is commonly done with electrical outlets and light switches. In other embodiments, the receptacle may be a round electrical box, a junction box, a vent, conduit, or any other objects that are configured to provide access points through the panel. These access points include household items, such as a sink, an electrical outlet or switch, recessed lighting, heating and ventilation ducts, and other common objects that transition from an interior portion of the building through the panel.

The protrusions 102 on the receptacle are configured to indent the surface of the panel when minimal amounts of pressure are applied to the panel as it is placed over the receptacle. In FIG. 1, there are four protrusions 102 integrally formed at corners of the rectangular receptacle 100. Additional protrusions 102 may be included at intermediate positions between the corners to ensure the indentations provide an accurate outline of the shape of the receptacle 100 on the interior surface of the panel.

In accordance with one aspect of the present disclosure, the receptacle 100 is a rectangular electrical box having a first end 104 configured to abut the panel and a second end 106 that faces the interior portion of the building. There are four walls 108 of the receptacle 100 that connect the first end 104 to the second end 106. All of the walls 108 have a thickness 110 and a length 112, where the length 112 corresponds to a distance between the first end 104 and the second end 106. In one embodiment the thickness 110 is 0.0625 inches and the length 112 is 3.25 inches.

The first end 104 of the receptacle 100 has a first surface 126 with a width that corresponds to the thickness 110 of the walls 108. The plurality of protrusions 102 are formed so as to extend outward from the first surface 126. In FIGS. 1 and 2, the protrusions 102 extend orthogonally from the first surface 126. However, the protrusions 102 may extend at various angles from the first surface 126 as required by the particular application.

In this embodiment, the protrusions 102 are truncated conical protrusions formed from the same material as the walls 108. The truncated conical protrusions 102 have an exterior surface 128 that is at an angle to the first surface 126 of the receptacle 100. A base 130 of the protrusions 102 is integrally formed with the first surface 126 of the receptacle 100. For example, if the receptacle 100 is formed from an industrial plastic, the protrusions 102 are added as features of a mold used to form the plastic receptacle 100. Including the protrusions 102 in the mold of the receptacle 100 will only slightly increase the cost of production.

It is to be understood that the base 130 of the protrusions may be less than or equal to the thickness 110 of the walls 108. The protrusions 102 may be formed in a variety of shapes that may be formed to indent specific types of materials of the panel. In one embodiment, the protrusions 102 have a height of 0.125 inches from the exterior surface 128 to the base 130. In other embodiments, instead of being parallel to the first surface 126, the exterior surface 128 may be at an angle to the first surface 126 to form a more pointed tip of the protrusions 102. A more pointed tip may be more useful for marking or indenting a sturdier panel material. Other examples of shapes of the protrusions 102 include a cylinder, a cone, a truncated cone, a triangular prism, a right triangular prism, a pyramid, and a truncated pyramid. Each of these shapes may be angled, such as an oblique truncated cone or pyramid to form a tapered point for piercing or indenting the surface of the panel. Some of these shapes will be described in more detail below.

In order to withstand the pressure of the applied panel without bending or breaking in order to create an indentation or a mark of the panel surface, the protrusions 102 must be sufficiently firm. However, the protrusions 102 are also configured to be removed after the geometric shape has been formed on the panel. For example, once the opening is formed in the panel by using an outline of the receptacle as formed by the indentations, the protrusions may be clipped, cut, filed down or otherwise removed from the front surface 126 of the receptacle. Alternatively, the protrusions may be bent or twisted by hand for removal.

In accordance with the illustrated embodiment, the receptacle walls 108 delimit a cavity 114 that is open at the first end 104 and closed at the second end 106. The cavity 114 is configured to house electrical wiring and fixtures that connect the wiring in the interior portion of the building to the electrical outlets, switches, or lights.

The receptacle 100 includes a plurality of support structures 116 configured to receive a fastener to secure the receptacle 100 to the frame of the building. The support structures are formed on a top surface 122 and on a bottom surface 124 of the receptacle. In FIG. 1, the support structures 116 are angled for ease of installation. These support structures 116 can be formed in a variety of shapes and at a variety of angles to accommodate different mounting configurations of the receptacle 100. The receptacle 100 also includes several punch-out portions 118 in the top surface 122. Other punch-out portions 118 may be included through the bottom surface 124 or through others of the walls 108. The punch-out portions 118 may be removed to allow wiring to be threaded into the receptacle 100.

A plurality of fastener openings 120 are provided for attaching a plate or a cover to the receptacle 100 once the panel is in place and the wiring has been connected. The fastener openings 120 are formed in raised ridges 132 that extend within the cavity 114. The raised ridges 132 form channels 134 in the top and bottom surfaces 122, 124 of the receptacle 100.

In addition, a plurality of stabilizers 136 is formed to extend from at least one of the walls 108. The stabilizers 136 support the receptacle 100 against a stud or portion of the frame to which it is affixed.

Figures 3A, 3B:
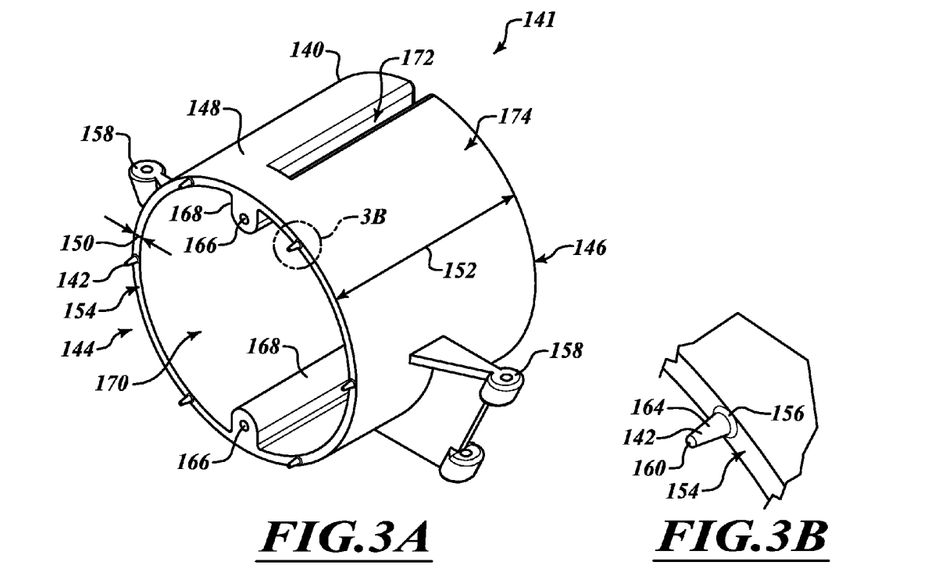
FIGS. 3A-3C are a front isometric view, an enlarged view of a conical protrusion, and a back isometric view, respectively, of a round receptacle having conical protrusions.
Figure 3C:
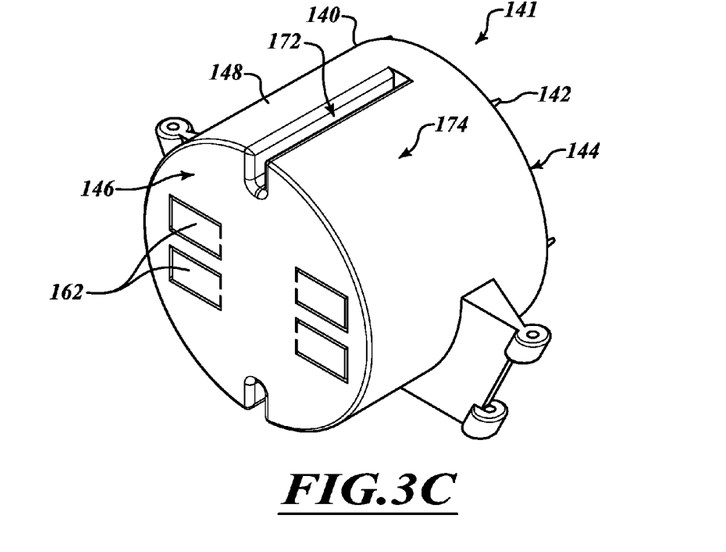

FIGS. 3A-3C are a front isometric view, an enlarged view of a conical protrusion 142, and a back isometric view, respectively, of an alternative embodiment of a construction device 141 for use in marking a surface of a panel. The device 141 includes a round receptacle 140 having a plurality of integrally formed conical protrusions 142. The round receptacle 140 has a first end 144 and a second end 145 connected by walls 148 that have a thickness 150 and a length 152.

At the first end 144, a first surface 154 of the walls 148 has a width that corresponds to the thickness 150 of the round receptacle 140. The plurality of protrusions 142 are integrally formed to extend away from the first surface 154. In this embodiment, the conical protrusions 142 include a rim 156 that is wider than a diameter of a base 164 of the conical protrusion 142. This protrusion has an exterior surface 160 formed from truncating the cone of the protrusion 142. The cone may form a point or be truncated at an angle.

In FIGS. 3A and 3B, six evenly spaced conical protrusions 142 are integrally formed on the first surface 154 around a perimeter of the cavity 114. The number of protrusions 142 may be increased or decreased as needed to accurately create the indentations of the shape of the exterior perimeter of the receptacle 140.

On opposing sides of the round receptacle 140, support structures 158 are formed for coupling the round receptacle 140 to the frame of the building. The round receptacle 140 may be used, for example, as a recessed lighting box in a ceiling. A plurality of punch-out portions 162 are provided at the second end 146 of the round receptacle and may be used to thread wires through the second end 146 for connection to a lighting fixture.

The round receptacle 142 includes fastener openings 166 that form raised ridges 168 in a cavity 170 of the receptacle 140. The fastener openings 166 form channels 172 on an exterior surface 174 of the walls 148.

Figure 4:
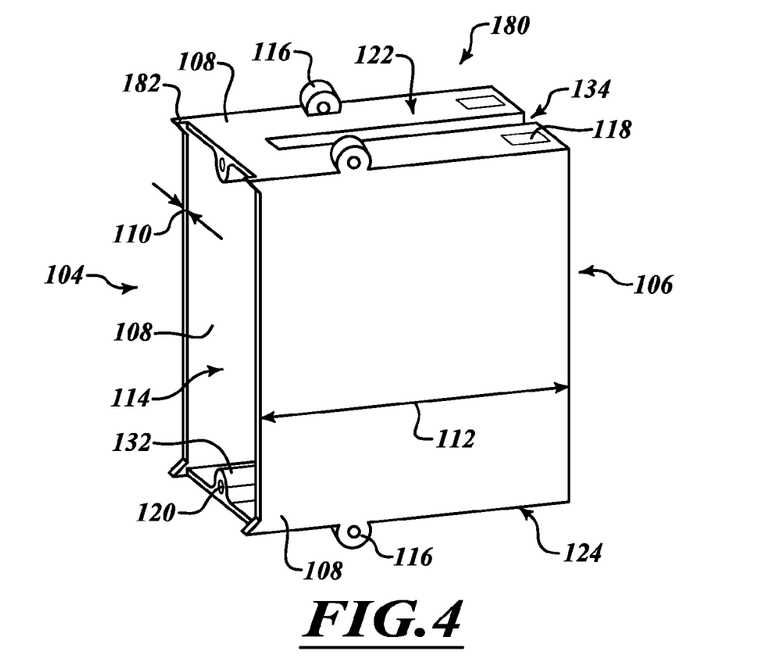
FIG. 4 is an isometric view of a rectangular receptacle having triangular protrusions.
Figure 5:
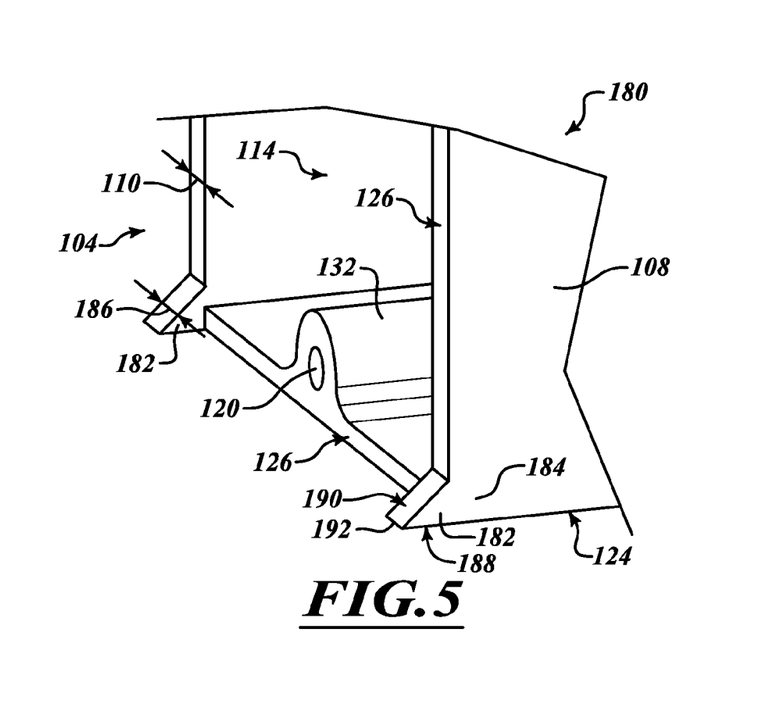
FIG. 5 is an enlarged view of one of the triangular protrusions of FIG. 4.

FIGS. 4 and 5 are an isometric view and an enlarged view, respectively, of right triangular prism protrusions 182 on a rectangular receptacle 180 in accordance with another embodiment of the present disclosure. The rectangular receptacle 180 is similar to the rectangular receptacle 100 from FIGS. 1 and 2. For example, the rectangular receptacle 180 has the cavity 114 delimited by the walls 108. The cavity 114 extends the length 112 of the receptacle 180 from the first end 104 to the second end 106. The rectangular receptacle 180 also includes the fastener openings 120 formed in the raised ridges 132 in the cavity 114.

The walls 108 of the receptacle 180 also have the thickness 110 and the length 112. The triangular prism protrusions 182 are formed at ends 184 of the side walls 108 adjacent to the top and bottom surfaces 122, 124. For example, in the enlarged view shown in FIG. 5, the triangular prism protrusions 182 are formed at an intersection of the bottom surface 124 and the side walls 108. The triangular prism protrusions 182 extend from the side walls 108 away from the first surface 126. In this embodiment, the triangular prism protrusions 182 have a thickness 186 that corresponds to the thickness 110 of the first surface 126.

A first surface 188 of the triangular prism protrusions 182 is coplanar with the bottom surface 124 of the receptacle 180. A second surface 190 of the triangular prism protrusion 182 extends from an intersection 192 with the first surface 188 of the protrusions 182 towards the first surface 126 of the receptacle 180. In one embodiment, a distance from the first surface 126 of the receptacle to the intersection 192 is 0.125 inches.

Figure 6:
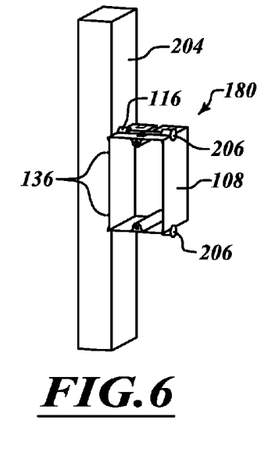
FIGS. 6-13 illustrate a sequence for forming a precise opening in a panel of SHEETROCK or drywall having the rectangular receptacle of FIG. 4.
Figure 7:
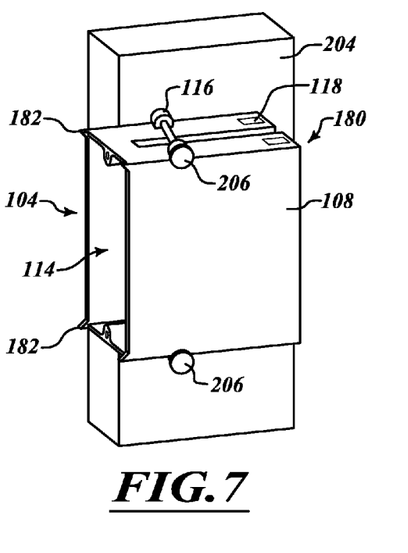

FIGS. 6-13 are illustrations of a sequence for forming a precise opening 200 in a panel 202 using the rectangular receptacle 180 of FIG. 4. FIGS. 6 and 7 are isometric front and side views of the receptacle 180 coupled to a stud or beam 204 that is part of the frame of the building. A plurality of fasteners 206 engage with the support structures 116 to hold the receptacle 180 against the beam 204. The fasteners 206 may be screws, nails, or other suitable attachment devices. The stabilizers 136 abut the beam 204 and allow for air flow around the walls of the receptacle 180.

Figure 8:
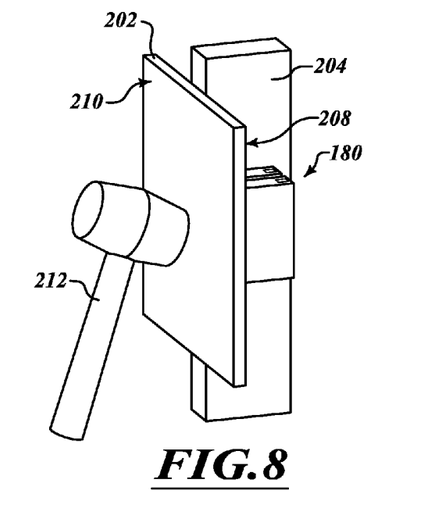

In FIG. 8, the panel 204 has a first surface 208 and a second surface 210, where the first surface 208 of the panel 204 is positioned adjacent to the first end 104 of the receptacle 180. Depending on the specific type of panel 204 used, the first and second surfaces 208 may have different physical properties. Some types of panels 204 will have firm surfaces that need more pressure to form the indentations. As mentioned above, the shape of the protrusions 182 can be adjusted for specific types of panel materials.

A mallet 212 may be used to tap the panel 204 to engage the protrusions 182 with the first surface 208 of the panel 204. Alternatively, a user may apply pressure with their hand or with other means sufficient to form indentations or marks with the protrusions 182. A plurality of different construction devices may be installed simultaneously with the receptacle 180, prior to installation of the panel 202. If each of the construction devices coupled to the beams 204 of the frame includes integrally formed protrusions, such as the triangular prism protrusions 182, each can be simultaneously marked when the panel 204 is tapped or pressed against the receptacle 180 and the other construction devices. This makes it easy for a user to quickly mark the locations of each receptacle and construction device and subsequently form accurate openings for each device. Forming accurate openings cuts down on wasted time and materials often needed to repair or adjust incorrectly formed openings.

Figure 9:
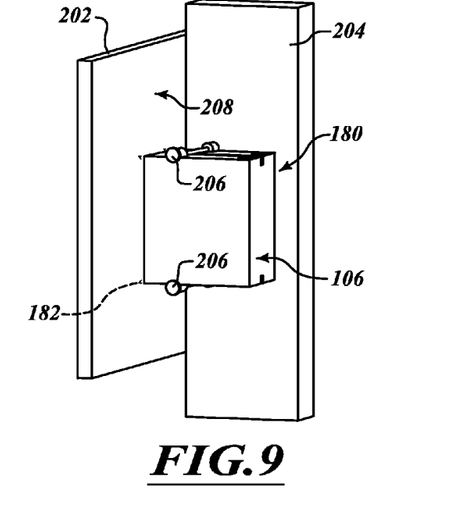

FIG. 9 is an isometric rear view of the receptacle 180 with the panel 202 after pressure is applied as shown in FIG. 8. The protrusions 182 are embedded at least partially into the first surface 208 of the panel 202.

Figure 10:
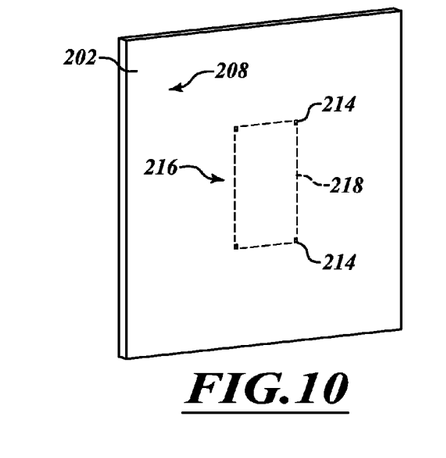

In FIG. 10, the panel 202 is removed from the receptacle 180. The protrusions 182 form indentations 214 in the first surface 208 of the panel 202. The indentations 214 are rectangular in shape, which correspond to a cross-section of the right triangular prism protrusions 182. The size of the rectangular shape of the indentations 214 depends on how far the protrusions 182 are pressed into the first surface 208. If the protrusion 182 was a conical protrusion, the indentations 214 would be circular.

The indentations 214 form a pattern 216 that corresponds to an outline of the shape of the rectangular receptacle 180. A user may chose to draw lines 218 to connect the indentations 214 to provide guidance in the form of a line as to where to cut the panel 202. Alternatively, a user may cut from one indentation 214 to an adjacent indentation 214 with a straight edge or free-hand. In one embodiment, the user makes the cuts along an outer edge of the indentation 214 to ensure the opening 200 is slightly larger than the first end 104 of the receptacle 180.

Figure 11:
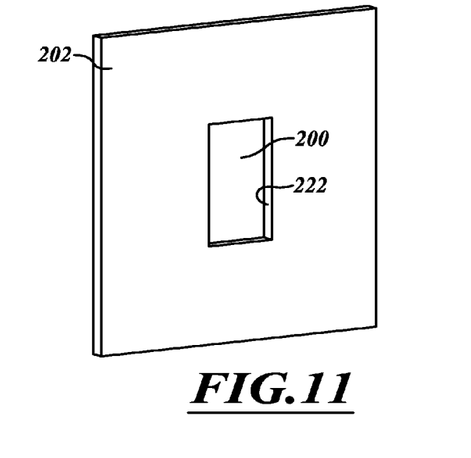
Figure 12:
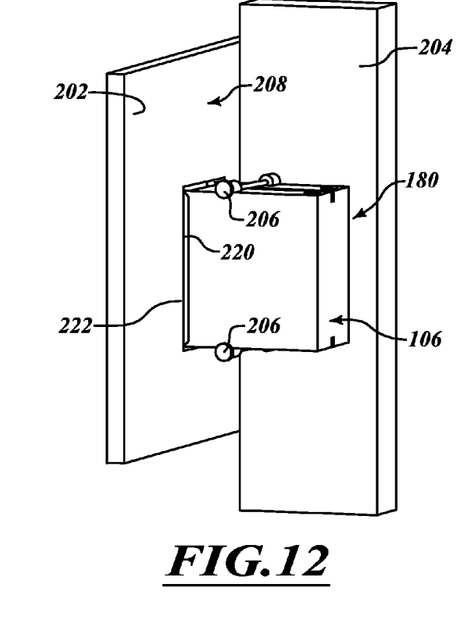

FIG. 11 shows the panel 202 after the opening 200 has been formed by cutting the portion of the panel 202 delimited by the indentations 214. Once all of the openings that correspond to the various construction devices are formed in the panel 202, the panel 202 is fixedly attached to the frame and seams between adjacent panels 202 are sealed. FIG. 12 is a back isometric view of the receptacle 180 after the panel 202 with the opening 200 is repositioned and aligned with the receptacle 180. A small space 220 may be formed between edges 222 of the opening 200 and the first end 104 of the receptacle 180.

Figure 13:
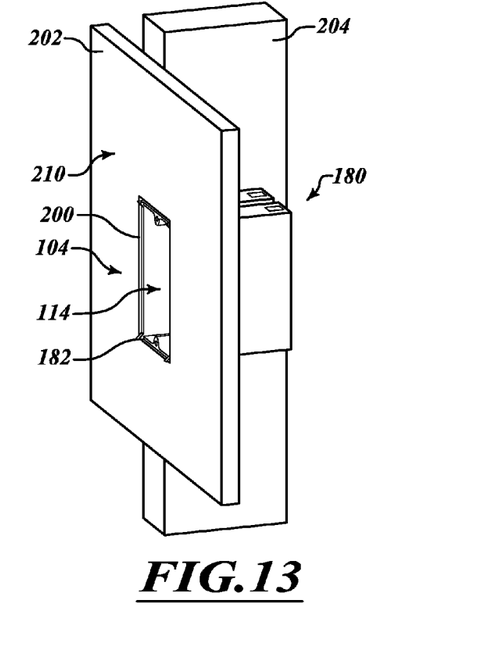

FIG. 13 is a front isometric view of the panel 202 fixedly attached to the frame and aligned with the receptacle 180. In one embodiment, the protrusions 182 extend past the second (outer) surface 210 of the panel 202. This occurs when the opening 200 is larger than the receptacle 180 by a sufficient amount such that the first surface 126 of the receptacle is in the same plane as the second surface 210 of the panel 202. In other embodiments, the protrusions 182 do not cross the plane of the second (outer) surface 210 of the panel 202. If needed, the protrusions 182 can easily be removed from the receptacle 180 either before or after the panel 202 is fixedly attached to the frame.

FIGS. 14-17 are views of a center-point marking device 250 for use with round conduits (not shown) in construction. The round conduits, like electrical boxes and other receptacles, are mounted on the frame and in conjunction with the panel 202 such as to protrude through the panel 202. These round conduits may include plumbing pipes that are of metal or plastic material, such as PVC. The round conduits come in a variety of diameters, which depend on where the conduits are installed and to what the conduit will be connected. For example, one type of conduit is configured to couple to a toilet, which may have a ¾ inch diameter. A sink will have two conduits, one for hot water and one for cold water. These two conduits for the sink may have a smaller diameter, such as a diameter of ½ inch. Drains, often used in showers and bathtubs, utilize larger conduits that have diameters in the range of 1.5 and 2 inches.

Figures 14, 15:
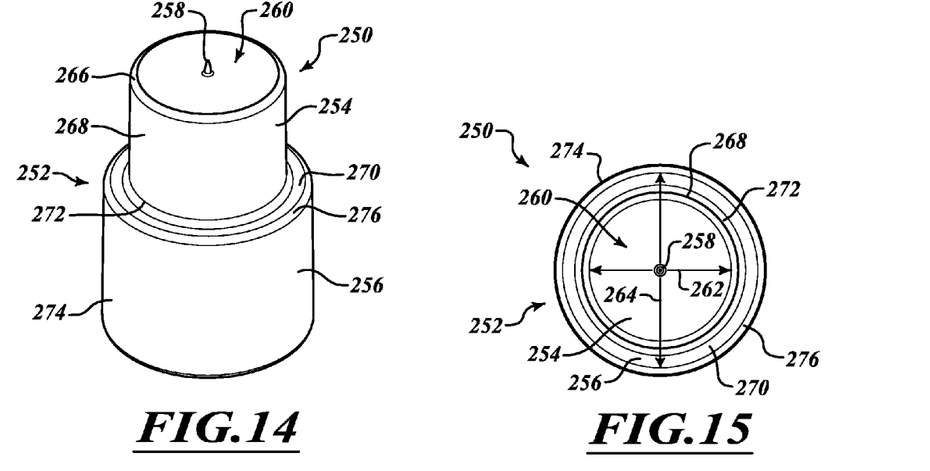
FIGS. 14-17 are views of a center point locating device.
Figure 16:
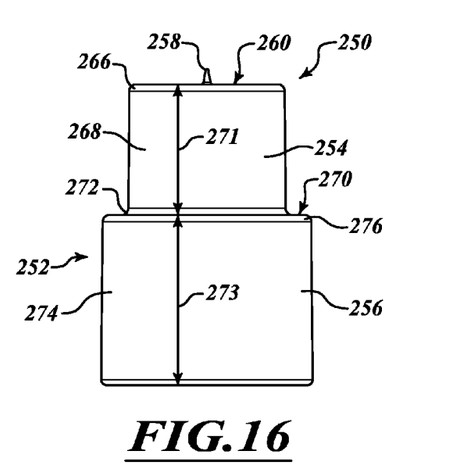
Figure 17:
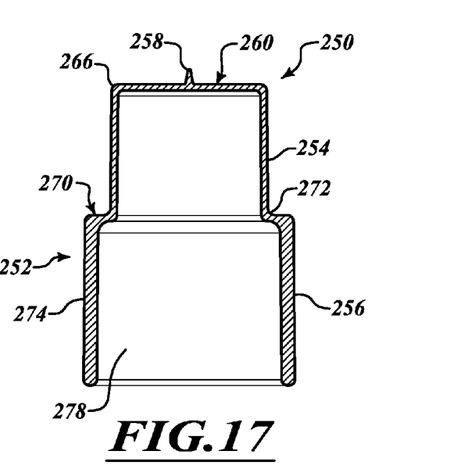

The marking device 250 includes a body 252 having a first portion 254 that is smaller than a second portion 256. The first and second portions 254, 256 of the body 252 are cylinders of having a first and a second diameter 262, 264, respectively, as shown in FIG. 15. The first and second diameters 262, 264 are configured to accommodate two different conduit diameters. The first portion 254 is configured to receive a smaller conduit, such as a pipe for the sink that has a ½ inch diameter. The second portion 256 is configured to receive a larger conduit than the first portion 254. For example, the second portion 256 may be configured to receive a pipe having a ¾ inch diameter.

A conical protrusion 258 is integrally formed extending from a circular surface 260 of the body 252. The protrusion 258 is positioned at a center point of the circular surface 260. When the marking device 250 is positioned on the pipe, the conical protrusion 258 is configured to mark the center point of the pipe on the surface of the panel 202. A user can then easily draw boundaries of the opening to be formed on the surface of the panel 202 by drawing a circle from the center point corresponding to a radius of the pipe. The center point marking device 250 may be sized and shaped in a variety of combinations to accommodate more than one size of pipe.

The conical protrusion 258 is formed to have a point, like a spike, that can easily penetrate the surface of the panel 202. As with the protrusions discussed above, the protrusions are not sized and shaped to pass all the way through the panel, but rather the protrusions are configured to form a visual indication or indentation in the panel to easily indicate the center point or shape of the object. The pointed conical protrusion 258 may be used for harder panel materials. Other shapes of the protrusion 258 may be used, such as a slightly rounded tip for marking softer materials like SHEETROCK or drywall. The protrusion 258 may also be a truncated cone, a pyramid, a truncated pyramid, a prism, or any other suitable shape for forming the indentations or marks on the surface of the panel.

Turning to the construction of the device 250, a disc-shaped circular surface 260 couples to or is integrally formed with a cylindrical wall 268 of the first portion 254, which is orthogonal to the circular surface 260, and which forms a first convex outer edge 266. The wall 268 of the first portion transitions to an intermediate shoulder surface 270 that has a concave portion 272. The circular surface 260 and the intermediate shoulder surface 270 are concentric circles, as can be seen in FIG. 15. The intermediate surface 270 couples to a cylindrical wall 274 of the second portion 256 with a second convex edge 276. The wall 274 of the second portion 256 is rounded at its terminal end, providing a smooth transition into an interior portion 278 of the marking device 250, as can be seen in the cross-sectional view on FIG. 17. In one embodiment, the wall 268 of the first portion 254 has a length 271 in the range of 0.435 and 1.25 inches and the walls 274 of the second portion 256 have a length 273 in the range of 0.7 and 1.625 inches.

The marking device 250 is reusable and makes marking the panel to form the opening a precise and simple task. This reduces the need for measurements and simplifies the process to avoid wasted time and supplies. In use, the marking device 250 is slipped on to an end of a conduit. The panel is then pressed against the marking device to form indentations that indicate a center point of the conduit. Other constructions devices, like the receptacles discussed above can simultaneously mark the panel when pressure is applied to form the center point indentation. The user can then form a circular opening in the panel based on a known conduit diameter that is centered on the center point as marked to form an accurate opening.

Figure 18:
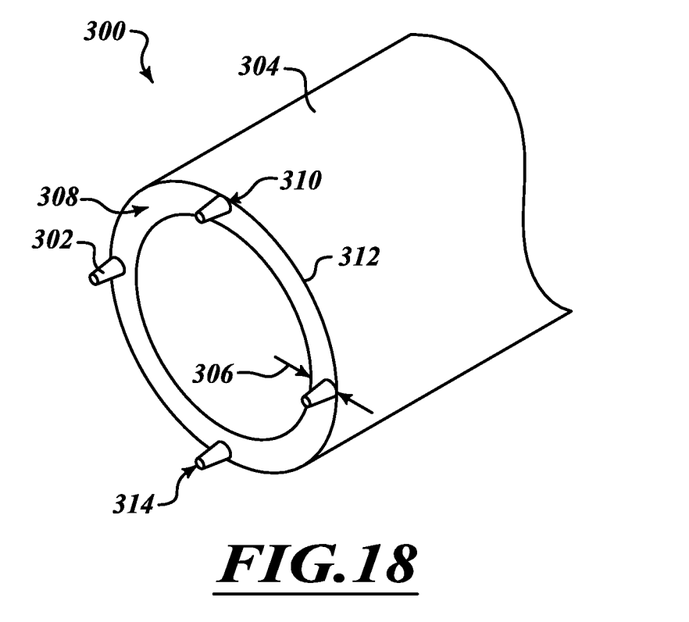
FIG. 18 is an isometric view of a round receptacle having conical protrusions.
Figure 19:
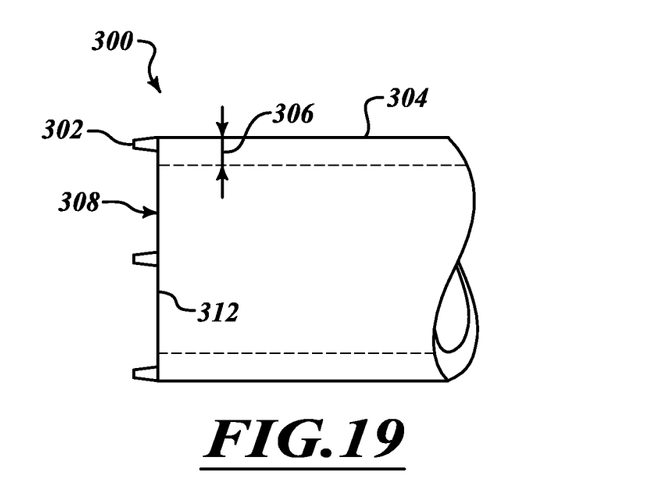
FIG. 19 is a side view of the round receptacle having conical protrusions.

FIGS. 18 and 19 are isometric and side views, respectively, of a conduit 300 having a plurality of integrally formed protrusions 302 configured to mark a panel during construction so as to indicate a shape of an opening to be formed. The conduit 300 and the protrusions 302 may be formed of metal or plastic. The conduit 300 may be formed as an end piece of conduit configured to be added adjacent to were the panel will be mounted. Alternatively, the conduit 300 may be a full length of conduit with the protrusions 302 formed on at least one end.

The conduit 300 has walls 304 that have a thickness 306. The conduit 300 has a first surface 308 that corresponds to the thickness 306 of the walls 304. A base 310 of the protrusions 302 is integrally formed onto the first surface 308. The base 310 abuts an outer edge 312 of the surface 308 so that the protrusions 302 form indentations in the panel that accurately indicate a size of an opening to form.

The protrusions 302 are preferably truncated conical protrusions that have a second surface 314 parallel to the first surface 308 of the conduit 300. It is to be understood that other shapes for the protrusions may be used. In an alternative embodiment, the second surface 314 may be angled with respect to the first surface 308. For example, the second surface 314 of the protrusions 302 may be angled to have a low point towards a center of the conduit 300 and a high point adjacent the outer edge 312. This angled protrusion 302 forms a sharper point, which is beneficial for forming indentations in harder panel materials.

The protrusions 302 extend orthogonally from the first surface 308. In other embodiments, the protrusions 302 may extend at an angle from the first surface 308. For example, the protrusions 302 may extend past the outer edge 312 so that indentations formed are slightly wider than the diameter of the conduit 300. These angled protrusions 302 can aid in ensuring the opening in the panel is sized and shaped to cooperate with the conduit 300 once the panel is fixedly attached to the frame of the building. As with the protrusions discussed above, the protrusions 302 are configured to be removable after formation of the indentations. The protrusions may be cut or otherwise knocked off of the first surface 308 to allow a fixture to securely attach to the conduit 300.

Figure 20:
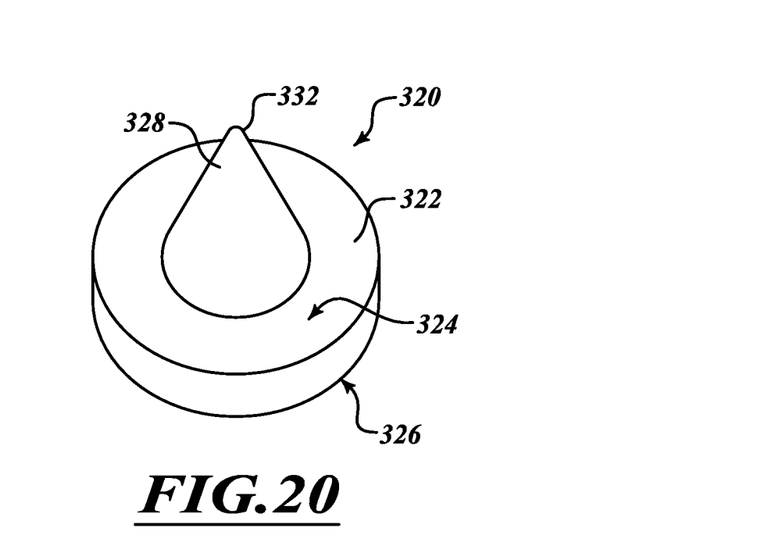
FIGS. 20 and 21 are an isometric view and a side view of an individual protrusion having an adhesive surface.
Figure 21:
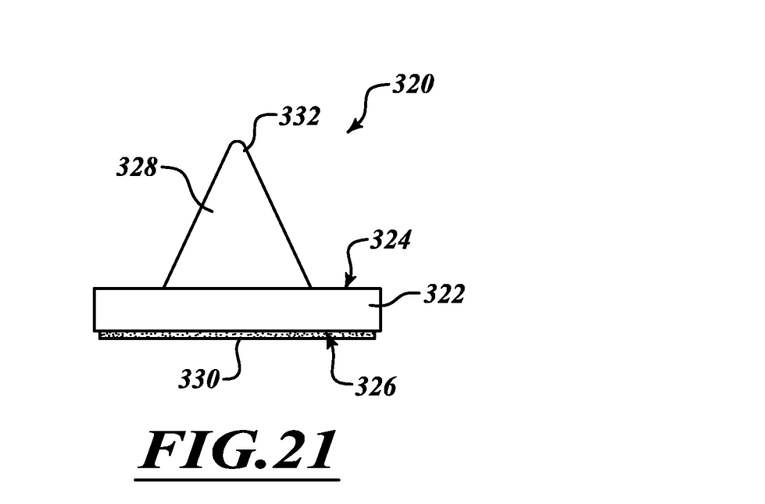

FIGS. 20 and 21 are an alternative embodiment of a marking device 320 to be used to form an indication corresponding to a shape of an object in a panel to be mounted in connection with the object. This marking device 320 may be used in remodeling projects where several existing objects will not be removed even though new panels are being installed. For example, if a cabinet is already secured to the frame of the building, the stand-alone protrusions 320 may be placed at intervals on a front of the cabinet to indicate the shape of the cabinet when the panel is pressed against the cabinet and marking device 320.

The marking device 320 includes a disc-shaped base 322 having a first surface 324 and a second surface 326. A conical protrusion 328 is integrally formed with the base 322 and extends from the first surface 324. The second surface 326 of the base 322 includes a material 330 for attaching the marking device 320 to the object. The material 330 may be an adhesive or other bonding agent sufficient to hold the marking device 320 in place while forming the indentations. The material 330 is configured to be easily removed from the object after the indentations are formed in the panel.

As with other embodiments described herein, the protrusions 328 can have alternative shapes and can be shifted from a center of the base 320. For example, instead of a cylindrical shape, the base 320 may have a rectangular shape with the protrusion 328 positioned in one corner. This will ensure the protrusion is aligned with an outermost edge of the object to accurately indicate the shape of the object with the indentations. In one embodiment, the base 320 has a ¼ inch diameter and the protrusion has a height of ⅛ inch from the first surface 324 to a tip 332.

The devices for marking described herein reduce the time needed to determine locations of and make accurate openings through the panels. A plurality of the devices may be used simultaneously to mark the panel with several objects at once, regardless of how haphazardly the objects were installed or of how the object is shaped.

The protrusions of the various embodiments described herein do not risk weakening the panel, such as panels formed of drywall or SHEETROCK, because the protrusions do not completely penetrate through the panel. This avoids creating dust and chalk in the room in which the panel is being installed since the indentations can be easily formed without completely puncturing both surfaces of the panel and without permanently attaching the panel to the wall. Once the indentations are formed, the panel can be taken into another room or garage where the openings can be formed. The indentations also make it easier for the pen or other writing utensil to form clear marking lines. The pen will not be clogged by chalk and will not repeated fall through holes formed by the sharp prongs of the prior art.

These protrusions are also advantageous because they are integrally formed with the construction devices and do not have to be carried around and placed on every single corner or edge of every single device.

In summary one embodiment of the present disclosure is directed to a construction device for use with a panel of SHEETROCK or drywall that includes a receptacle configured to provide an indication of a size and geometric shape of the receptacle on the panel of SHEETROCK. The receptacle includes walls having a thickness and a length, a cavity delimited by the walls, a first end of the walls that circumscribe the cavity, and a plurality of protrusions extending from the first end, the protrusions integrally formed with the first end and configured to indent the panel of SHEETROCK without penetrating an outer surface of the SHEETROCK to form a pattern that corresponds to the geometric size and shape of the receptacle.

The protrusions are formed to be one from among a cylinder, a cone, a truncated cone, a triangular prism, a right triangular prism, a pyramid, and a truncated pyramid. In one embodiment, a diameter of the protrusions is less than the thickness of the walls. The receptacle may be a rectangular electrical box having the plurality of protrusions positioned at corners of the box. Alternatively, the receptacle is a round electrical box or a conduit.

In an alternative embodiment of the present disclosure, a construction device to aid in forming an opening in a wall member having a solid surface, the opening matching the size and shape of a receptacle adjacent the solid surface is provided. The device includes a front face defined by walls of the receptacle, the front face having an inner edge and an outer edge that correspond to the shape of the receptacle and a plurality of protrusions integrally formed on the front face and positioned adjacent to the outer edge, the protrusions extending from the front face and arranged in a pattern that corresponds to the size and shape of the front face of the receptacle, each protrusion having a terminal face structured to indent the solid surface without puncturing the solid surface.

The terminal face of the protrusions have a geometric shape of one from among a circle, an oval, a square, a rectangle, a triangle, and a polygon. The protrusions are one from among a cylinder, a cone, a truncated cone, a triangular prism, a right triangular prism, a pyramid, and a truncated pyramid.

In addition, the protrusions extend orthogonally from the front face by a distance so that the protrusion does not puncture the solid surface. In other embodiments, the protrusions extend past an outer edge of the front face by a distance to enable the protrusions to indent the solid surface without puncturing the solid surface. The shape of the receptacle is one from among a circle, a square, a rectangle, a triangle, and a polygon.

In another embodiment, a center-point marking device for use with planar structures having an outer surface is provided. The marking device includes a cylindrical body having a first end and a second end, where the body includes a first cylindrical portion having a closed end and a cylindrical wall extending from the closed end, the closed end corresponding to the first end of the body, a second cylindrical portion that is larger in diameter than a diameter of the first cylindrical portion, the second cylindrical portion having a cylindrical wall extending from a shoulder formed on an open end of the first cylindrical portion, the second cylindrical portion having an open end circumscribed by an outer face, and a protrusion integrally formed with the closed end of the first cylindrical portion and extending from a center point of the closed end.

The first diameter is configured to receive a first conduit and the second diameter is configured to receive a second conduit. The protrusion has a terminal face structured to penetrate the outer surface of the planar structure without extending entirely through the planar structure. The protrusion is formed to be one from among a cylinder, a cone, a truncated cone, a triangular prism, a right triangular prism, a pyramid, and a truncated pyramid.

The various embodiments described above can be combined to provide further embodiments. All of the U.S. patents, U.S. patent application publications, U.S. patent application, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A construction device for use with a panel of drywall, comprising:
   a receptacle configured to provide an indication of a size and geometric shape of the receptacle on the panel of drywall, the receptacle including:
      walls having a thickness and a length, the walls delimiting a cavity, the walls including a first end that circumscribes the cavity; and
      a plurality of protrusions extending from the first end of the walls, the protrusions integrally formed with the first end of the walls, each of the protrusions having a terminal planar surface spaced from the first end of the walls, the terminal planar surface configured to indent the panel of drywall without penetrating an outer surface of the drywall to form a pattern that corresponds to the geometric size and shape of the receptacle, the protrusions configured to be manually removable from the first end of the walls.

2. The device of claim 1 wherein the protrusions are formed to have a geometric shape in the form of one from among a cylinder, a cone, a truncated cone, a triangular prism, a right triangular prism, a pyramid, and a truncated pyramid.

3. The device of claim 1 wherein a diameter of the protrusions is less than the thickness of the walls.

4. The device of claim 1 wherein the receptacle is a rectangular electrical box.

5. The device of claim 4 wherein the plurality of protrusions are positioned at corners of the rectangular electrical box.

6. The device of claim 1 wherein the receptacle is a round electrical box.

7. The device of claim 1 wherein the receptacle is a conduit.

8. A construction device to aid in forming an opening in a wall member having a solid surface, the opening matching the size and shape of a receptacle adjacent the solid surface, the device comprising:
   a front surface of walls of the receptacle, the front surface having an inner edge on an interior surface of the receptacle and an outer edge on an exterior surface of the receptacle; and
   a plurality of protrusions integrally formed on the front surface and positioned adjacent to the outer edge, the protrusions extending from the front surface and arranged in a pattern that corresponds to the size and shape of the front surface of the receptacle, each protrusion having a terminal planar surface spaced from the front surface of the walls, the terminal planar surface configured to bear against and indent the solid surface of the wall member without puncturing the solid surface.

9. The device of claim 8 wherein the terminal face of the protrusions have a geometric shape of one from among a circle, an oval, a square, a rectangle, a triangle, and a polygon.

10. The device of claim 8 wherein the protrusions are one from among a cylinder, a cone, a truncated cone, a triangular prism, a right triangular prism, a pyramid, and a truncated pyramid.

11. The device of claim 8 wherein the protrusions extend orthogonally from the front face by a distance so that the protrusion does not puncture the solid surface.

12. The device of claim 8 wherein the protrusions extend past an outer edge of the front face by a distance to enable the protrusions to indent the solid surface without puncturing the solid surface.

13. The device of claim 8 wherein the shape of the receptacle is one from among a circle, a square, a rectangle, a triangle, and a polygon.

\* \* \* \* \*